United States Patent [19]

Shou et al.

[11] Patent Number: 5,790,590
[45] Date of Patent: Aug. 4, 1998

[54] MATCHED FILTER CIRCUIT

[75] Inventors: Guoliang Shou; Changming Zhou; Makoto Yamamoto; Sunao Takatori; Mamoru Sawahashi; Fumiyuki Adachi, all of Tokyo, Japan

[73] Assignees: Yozan Inc.; NTT Mobile Communications Network, Inc., both of Tokyo, Japan

[21] Appl. No.: 740,672

[22] Filed: Oct. 31, 1996

[30] Foreign Application Priority Data

Nov. 2, 1995 [JP] Japan ................................. 7-310021

[51] Int. Cl.$^6$ ................................................ H04B 15/00
[52] U.S. Cl. ........................ 375/200; 375/208; 375/355; 329/304
[58] Field of Search ............................. 375/200, 206, 375/207, 208, 283, 331, 340, 354–355, 362, 367, 376; 329/304, 307, 309; 327/141, 144–152, 156, 182, 197, 203, 201; 455/182.2, 182.3, 191.1, 191.3

[56] References Cited

U.S. PATENT DOCUMENTS 4,095,226  6/1978  Kratzar ................................. 342/393
5,400,368  3/1995  Cheng et al. ......................... 375/354
5,581,579  12/1996 Lin et al. ............................. 375/331
5,654,991  8/1997  Andren et al. ....................... 375/355

OTHER PUBLICATIONS

Tanaka et al., "Development of Low Power Consumption LSI for SS Communication", Technical Report of IEICE, SST95-77, 1995-10.

Ogawa et al., "Development of 1 Chip SS Communication LSI Using Digital Matched Filters", Technical Report of IEICE, ISEC94-42, SST94-65, 1994-12.

Dual 64-TAP, 11 Mcps Digital Matched Filter/Correlator STEL-3310, Stanford Telecommunications, 1990.

Primary Examiner—Stephen Chin
Assistant Examiner—Joseph Roundtree
Attorney, Agent, or Firm—Cushman Darby & Cushman IP Group of Pillsbury Madison & Sutro LLP

[57] ABSTRACT

The present invention has an object to provide a matched filter circuit which is possible to synchronize a spreading code with an input signal. A matched filter according to the present invention samples input signal in response to three clocks from the first to the third shifted by a half cycle of a sampling signal so as to judge whether the sampling clock is ahead or behind of the input signal according to signs of input signal sampled. One clock is selected to be the sampling clock.

14 Claims, 5 Drawing Sheets

1

MATCHED FILTER CIRCUIT

FIELD OF THE INVENTION

The present invention relates to a matched filter circuit for a spread spectrum communication system of mobile and personal radio and a wireless LAN, especially to a matched filter which is capable of high speed processing by a LSI of small size with reduced power consumption.

BACKGROUND OF THE INVENTION

A matched filter is a filter for judging the identification of two signals. In the spread spectrum communication, unique spreading code sequences are allocated to users. Each user finds a signal transmitted for the user by a matched filter to which one spreading code sequence is applied. The matched filter outputs correlation peak when the signal is the user's for a aquisition and holding.

Assuming a spreading code to be PN(i), a tip time to be Tc, a spreading ratio to be M, a time to be (t), an input signal on a time t to be S(t) and a correlational output signal on a time t to be R(t), the formula (1) can be obtained.

$$R(t) = \sum_{i=0}^{M-1} PN(i) \cdot S(t - i \cdot Tc) \qquad (1)$$

Here, PN(i) is a 1 bit data sequence.

S(t−i·Tc) is a value performed sampling by a chip time. When a synchronicity of an input signal and sampling clock is not enough, each level of S(t−i·Tc) is low and consequently an output level of R(t) becomes low. It causes low accuracy of a peak detection.

As double or higher order of sampling is necessary for the acquisition, the calculation of the formula (1) is performed in a plurality of systems at the same time using a plurality of matched filters and the calculation results are added. In order to realize such "a matched filter system" (a combination of a plurality of matched filters and other circuits is represented by this expression), a digital circuit or a SAW (Surface Acoustic Wave) device was conventionally used. However, when using a digital circuit, the electric power consumption was large because the size of a circuit was large, therefore, it was not appropriate to a mobile communication. When using a SAW element, it was not easy to realize a whole circuit by a LSI device and the S/N ratio was low.

Since the spreading code is 1 bit string, the inventors propose a matched filter, in the Japanese patent application No. 7-212438, of high-speed processing with a small size and low power consumption LSI by the processing's that i) sampling and holding input signals as analog signals of time series, ii) branching out them into the signal groups of "1" and "−1" by a multiplexer, and iii) adding the signals in each groups in parallel by a capacitive coupling.

However, any solution is not clearly shown concerning to the synchronism of an input signal and a sampling clock in the above application.

SUMMARY OF THE INVENTION

The present invention solves the above problem and has an object to provide a matched filter circuit which is possible to synchronize a spreading code with an input signal.

A matched filter according to the present invention samples input signal in response to three clocks from the first to the third shifted by a half cycle of a sampling signal so as to judge whether the sampling clock is ahead or behind of the input signal according to signs of input signal sampled. One clock is selected to be the sampling clock.

PREFERRED EMBODIMENT OF THE PRESENT INVENTION

Hereinafter an embodiment of a matched filter circuit according to the present invention is described with reference to the attached drawings.

Figure 1:
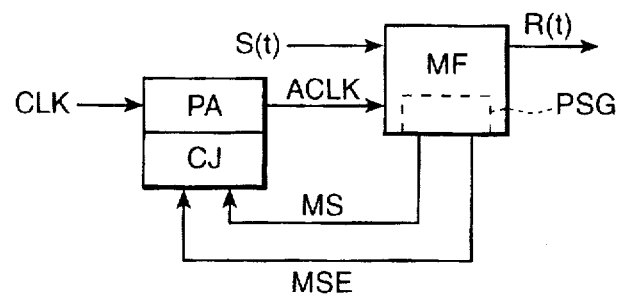
FIG. 1 shows a block diagram of a whole structure of an embodiment of the matched filter circuit according to the present invention.

In FIG. 1, an input signal S(t) is sampled by a matched filter MF in response to a sampling clock ACLK and an output signal R(t) is output by the matched filter MF. The sampling signal is generated by a sampling clock generating circuit of FIG. 2 and outputted from a phase adjusting circuit PA of the sampling clock generating circuit. A basic clock CLK of higher frequency than the sampling clock of a 8th period length of the sampling clock is input to the phase adjusting circuit which generates the sampling clock from the basic clock. The matched filter MF generates inside a main clock MCLK synchronous to the sampling clock ACLK and an inverted signal SCLK of MCLK shown in FIG. 3. The input signal S(t) is sampled in response to these signals MCLK and SCLK three times successively shifted by a half cycle of the sampling clock one after another. The phase adjusting circuit outputs signals MSE and MS representing combinations of signs of input signal sampled.

Figure 2:
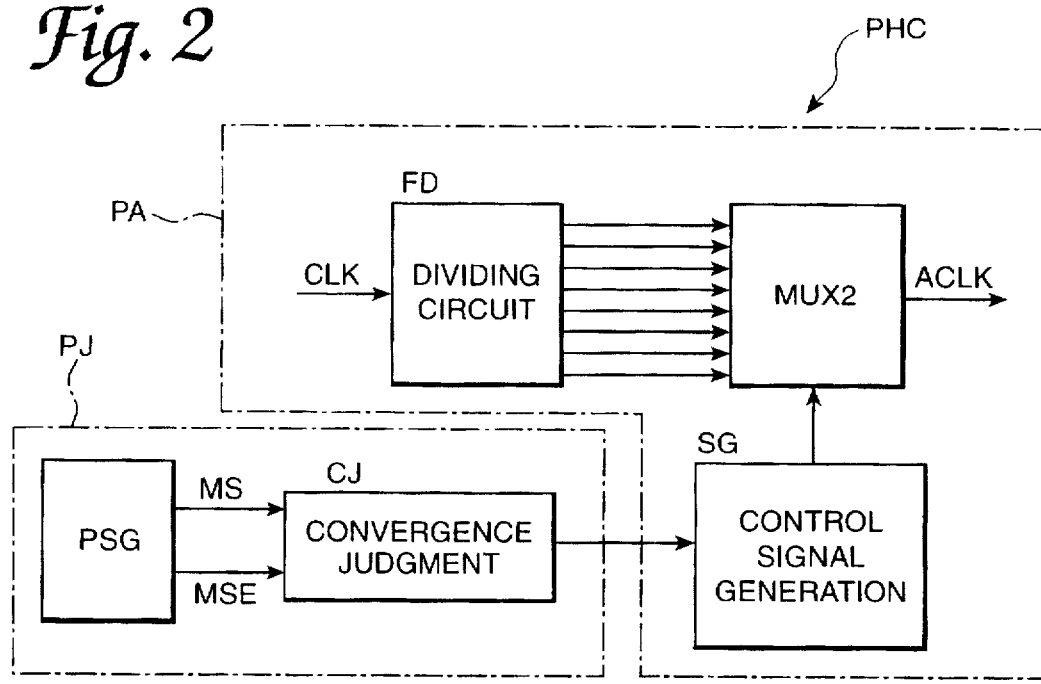
FIG. 2 shows a block diagram of a sampling clock generating circuit in the embodiment.

In FIG. 2, a sampling clock generating circuit PHC consists of an adjusting clock generating circuit FD and a clock multiplexer MUX2. The FD generates successive eight different sampling clocks shifted by ⅛ cycle one after another. The clock CLK is divided into eight short pulses for the eight sampling clocks. The working cycle is divided into eight. The multiplexer MUX2 selectively outputs one of the eight kinds of sampling clocks as ACLK.

The signals MSE and MS are generated by a phase signal generating circuit PSG, and the sampling clock generating circuit PHC judges signals MSE and MS by a convergence judgment circuit CJ. The circuits PSG and CJ construct a phase judgment circuit PJ and judges the relationship between a sampling clock and an input signal.

Figure 3:
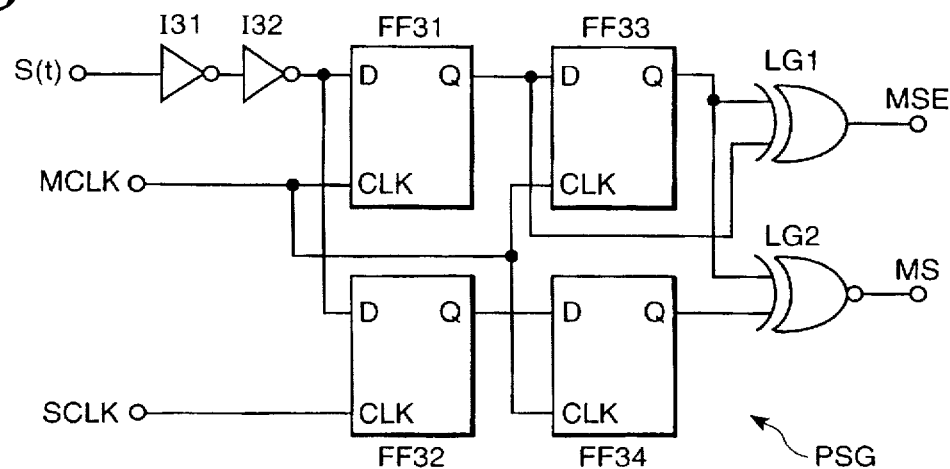
FIG. 3 shows a phase signal generating circuit in the embodiment.

In FIG. 3, the circuit PSG consists of serial MOS inverters I31 and I32, and an input signal S(t) is input to the first inverter I31. The I31 and I32 output a supply voltage Vdd when S(t) is a plus signal and output the ground voltage when it is a minus signal, that is, they generate sign signals. An output of I32 is inputted to a data input of parallel flip-flops FF31 and FF32. The MCLK is inputted to a clock input of FF31 and the SCLK is inputted to a FF32. The FF31 and FF32 hold data in response to a rising of clock. When FF32 has held the sign signal of S(t), FF31 has already held the sign signal of S(t−Tc/2). A data input of a flip-flop FF33 is connected to a non-inverted output Q of FF31, and the MCLK is inputted to a clock input of FF33. Therefore FF33 holds a sign signal of S(t−Tc). A data input of a flip-flop FF34 is connected to a non-inverted output Q of FF32, and the MCLK is inputted to a clock input of FF34. FF34 holds a sign signal of S(t−Tc/2) at this point. Sign signals of input signals shifted by ½ cycle successively are held by FF33, FF34, FF31 and FF32. These sign signals are expressed by SGN(t−Tc), SGN(t−Tc/2), SGN(t) and SGN(t+Tc/2). The non-inverted output Qs of the flip-flops FF33 and FF34 are connected to logical gates LG1 and LG2, respectively. The non-inverted outputs of FF31 and FF33 are inputted to LG1 and LG2, respectively, at the same time. LG1 and LG2 are logical gates of EX_OR and EX_NOR, respectively, which calculate MSE and MS by the logical operation below.

$$MSE = SGN(t) \oplus SGN(t - Tc) \quad (2)$$

$$MS = SGN\left(t - \frac{Tc}{2}\right) \oplus SGN(t - Tc) \quad (3)$$

The formula (2) means that signs of input signals on the current cycle and the previous cycle are different, and it gives a prerequisite of the phase judgment. When signs of input signals are successively constant, the phase judgment is impossible. The phase judgment is performed by the circuit CJ when MSE=1 in the formula (2).

Figure 12:
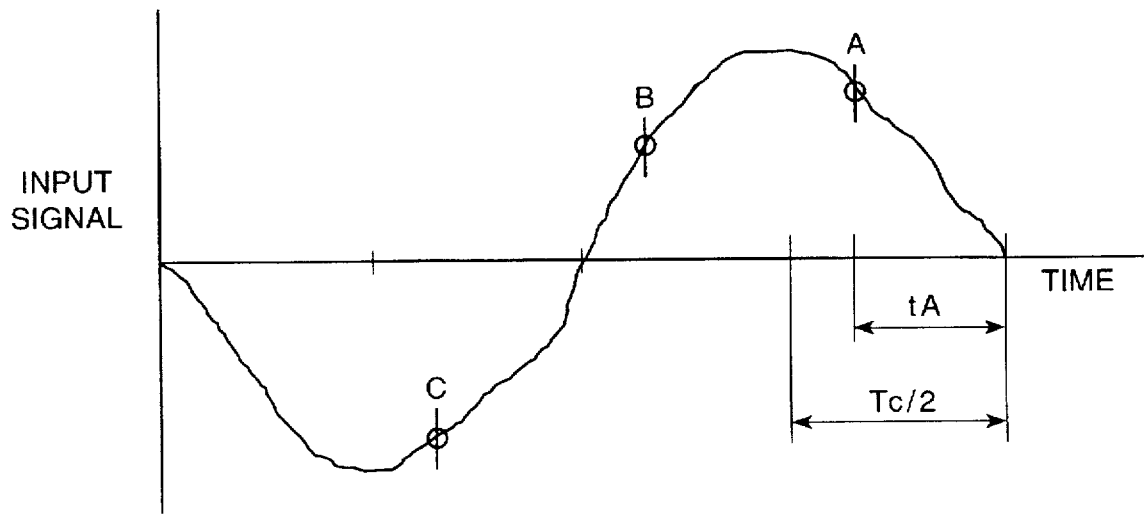
FIG. 12 shows a graph of the relationship between input signals and sampling clocks.

The formula (3) shows the difference between signs of a signal on the timing ahead by Tc/2 than S(t), and a signal further ahead by Tc/2. As shown in FIG. 12, when an input signal S(t) is sampled three times on the successive points A, B and C shifted by ½ cycle one after another, S(t), S(t−Tc/2) and S(t−Tc) in the formula (3) correspond to C, B and A, respectively. When a phase of a sampling clock is ahead of the input signal, the time length from A to the start point of the cycle tA is equal to or less than (Tc/2). B is included in the same cycle as A, and C is included in the cycle different from A and B. When a sampling clock is behind (not shown), the time length from A to the start point of the cycle is equal to or more than Tc/2. B is included in the cycle different from A, and C is included in the same cycle as B. When S(t−Tc/2) and S(t−Tc) are in the same cycle, MS is 1, and when they are in the separate cycles, MS is 0. That is, a sampling clock is ahead when MS=1, and it is behind when MS=0.

The circuit CJ judges the above and inputs a signal indicating whether a sampling clock is ahead or behind to a control signal generating circuit SG. The control signal generating circuit SG switches the multiplexer MUX2 in response to the signal from CJ so that the sampling clock is delayed by ⅛ cycle when the sampling clock is ahead, and the clock becomes ⅛ cycle is advenced when the sampling clock is behind. The circuits FD, MUX2 and SG construct the phase adjusting circuit PA. The clock unit is not necessary to be ⅛ cycle, and neither to be constant.

The circuit CJ judges that an input signal and a sampling clock are synchronous with each other when MS=1 and MS=0 are repeatedly inputted, that is, when a sampling clock is repeatedly inputted by a predetermined times (10 times, for example), it is judged that a phase adjustment is converged and the phase adjustment is not performed for a predetermined period (period of several tens of symbols, for example).

Figure 4:
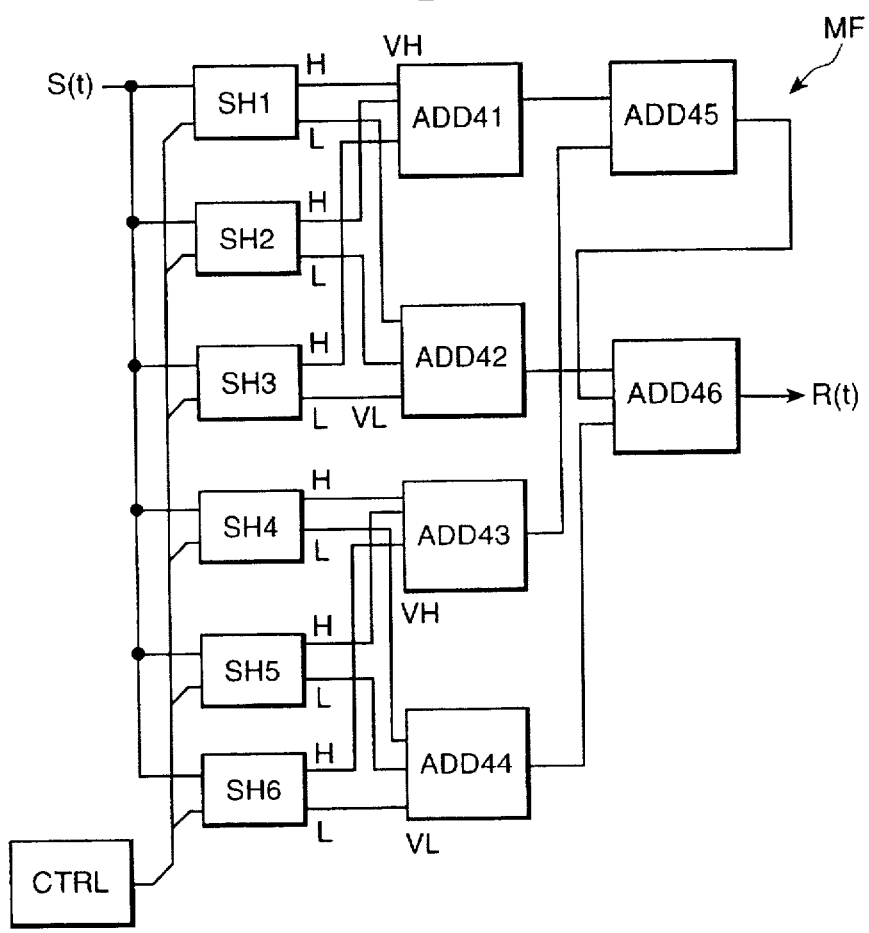
FIG. 4 shows a calculation portion of a matched filter in the embodiment.

In FIG. 4, in the matched filter circuit MF, an input voltage S(t) is parallelly connected to a plurality of sampling and holding circuits SH1, SH2, SH3, SH4, SH5 and SH6, and two types of outputs of H (high) and L (low) are generated from each sampling and holding circuit. A control circuit CTRL is connected to the sampling and holding circuits so as to control S(t)to be inputted to one of the sampling and holding circuits, successively.

The sampling and holding circuit introduces the input voltage S(t) to either H side or L side according to the control of the control circuit. A reference voltage Vr is connected by the control circuit to the other side. This route selection is performed according to each bit of spreading code (PN code) and a multiplication of input voltage by the code is accomplished only by this selection.

Figure 5:
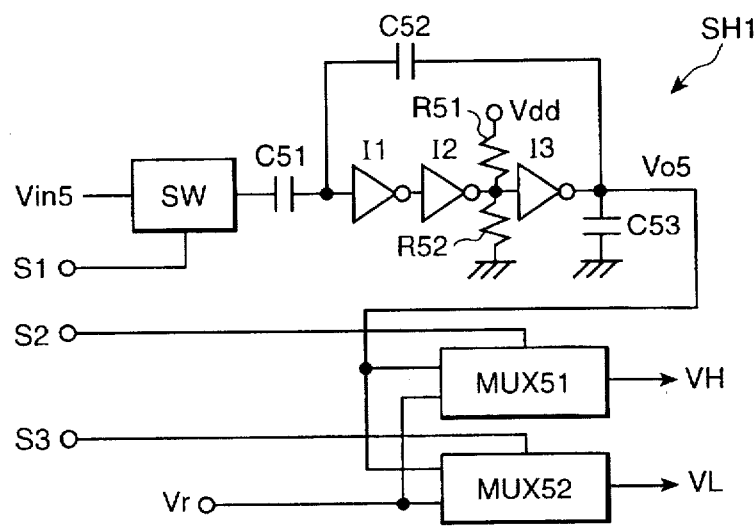
FIG. 5 shows the sampling and holding circuit in FIG. 4.

The sampling and holding circuit SH1 is structured as in FIG. 5, in which an input voltage S(t) is connected to a switch SW. An output of switch SW is connected to capacitance C51, and three stages of serial MOS inverters I1, I2 and I3 are connected to an output of capacitance C51. An output of MOS inverter I3 of the last stage Vo5 is connected to an input of I1 through feedback capacitance C52. Consequently, an inversion of S(t) is generated at the output of I3 with a good linearity. An output of I3 is inputted to two multiplexers MUX51 and MUX52. A common reference voltage Vr is connected to the multiplexers. When SW is closed, C51 is charged by an electric charge corresponding to S(t), and the linearity of an output is guaranteed by a feed-back function of I1 to I3. When a switch SW is opened after it, sampling and holding circuit SH1 holds S(t).

Switch SW, multiplexers MUX51 and MUX52 are controlled by control signals S1, S2 and S3. After S1 is once closed, SW is opened at the timing of sampling of the input voltage. S2 and S3 are inverted signals. When one of the multiplexers outputs Vin5, the other outputs Vr.

MUX51 generates an output of H (high type) above and MUX52 generates an output of L (low type). H and L correspond to each bit of the spreading codes "1" and "−1". When the code "1" is to be multiplied to an input voltage, Vin5 is outputted from MUX51, and when the code "−1" is to be multiplied, Vin5 is outputted from MUX52.

The output from I3 of the last stage is connected to the ground through a grounded capacitance C53. The output of I2 of the second stage is connected to the supply voltage Vdd and the ground through a pair of balancing resistances R51 and R52. Unstable oscillations of an inverted amplifying circuit including feedback circuit is prevented by such a structure.

Figure 6:
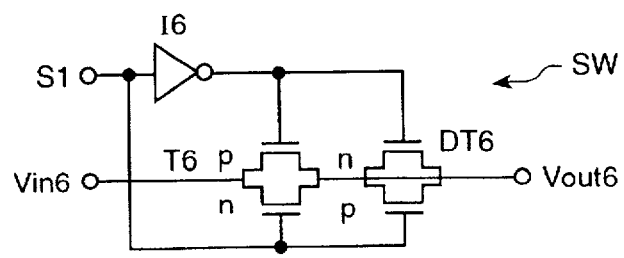
FIG. 6 shows the switch in FIG. 5.

As shown in FIG. 6, the switch SW includes a transistor circuit T6 in which a source and a drain of a n-type MOS transistor are connected to a drain and a source of a p-type MOS transistor, respectively. Vin6 is connected to a terminal of a drain of the nMOS of the transistor circuit and a terminal of a source of nMOS is connected to an output terminal Vout6 through a dummy transistor DT6 similar to the nMOS. S1 is inputted to the gate of the nMOS transistor of the transistor circuit T6, and an inverted signal of S1 by an inverter I6 is inputted to the gate of pMOS transistor. When S1 is high level, T6 is conductive and when it is low level, T6 is cut off.

Figure 7:
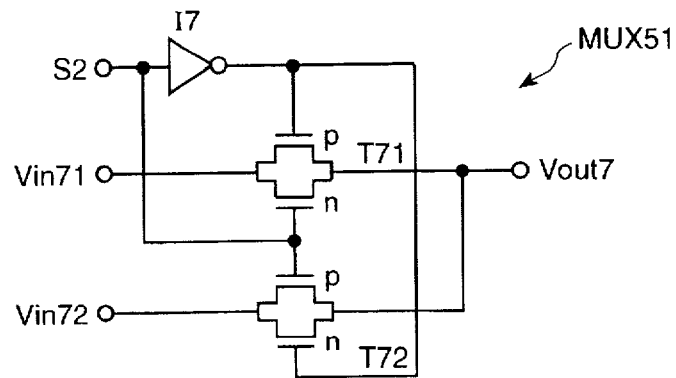
FIG. 7 shows the multiplexer in FIG. 5.

As shown in FIG. 7, in multiplexer MUX51, the terminal of the source of nMOS of transistor circuits T71 and T72 is connected to the common output terminal Vout7. An output Vo5 of the MOS inverter I3 ("Vin71" in FIG. 7) is connected to a terminal of a drain of the nMOS of T71, and the reference voltage Vr is connected to a drain of T72 ("Vin72" in FIG. 7). The signal S2 is inputted to a gate of the nMOS transistor of transistor circuit T71 and gate of the pMOS transistor of transistor circuit T72. The signal S2 inverted by inverter I7 is inputted to gates of the pMOS of T71 and nMOS of T72. When S2 is high level, T71 is conductive and T72 is cut off, and when low level, T72 is conductive and T71 is cut off. That is, MUX51 can alternatively outputted Vo5 or Vr in response to the control signal S2.

Though it is not shown in the figure, multiplexer MUX52 is structured similar to MUX51 and Vo5 and Vr are connected inversely. Vr and Vo5 of FIG. 7 are connected to T71 and T72, respectively, contrary to the construction of FIG. 7. Consequently, MUX52 outputs inversely to MUX51; that is, when MUX51 outputs Vo3, MUX52 outputs Vr and when MUX51 outputs Vr, MUX52 outputs Vo5.

Signal S2 corresponds to spreading code and outputs 1×S(t)=S(t) to AD41 when S2=1. At this time, S3 is "−1" and Vr corresponding to "0" is outputted to ADD42. When S2=−1, Vr corresponding to "0" is outputted to ADD41. Here, S3=+1 and outputs 1×S(t)=S(t) to ADD42.

The S(t−i·Tc) in the formula (1) is an input voltage held in each sampling and holding circuit, and PN(i) is the signal S2(spreading code) to be inputted to each sampling and holding circuit. The order of the spreading codes is predetermined corresponding to the order of input signals. When a new signal is taken, the oldest signal is substituted by the newest signal. It causes change in relationship between each sampling and holding circuit SH1 to SH6 and PN(i), so PN(i) is shifted by the control circuit. When a code shift is not performed, code transfer through successive sampling and holding circuits and some errors may be generated due to data transfer. It will be understood that the code shift is effective to prevent the error during data transfer.

The accumulation in formula (1) is performed in the addition portions from ADD41 to ADD46. VH and VL of output voltages of each sampling and holding circuit are accumulated in ADD45 and ADD46, respectively. This accumulation is not performed directly. Sampling and holding circuits are divided into a plurality of groups, outputs VH and VL are once accumulated in ADD41 to ADD44 by each group. All of the outputs of ADD41 and ADD43 for accumulating VH are inputted to ADD45, and all of the outputs of ADD42 and ADD44 for accumulating VL are inputted to ADD46. Further, an output of ADD45 is also inputted to ADD46. In FIG. 4, six sampling and holding circuits are shown and divided into two groups with three circuits. Generally a spreading code includes from 100 to several hundreds or more bits. Sampling and holing circuits are set to be an appropriate number.

Figure 8:
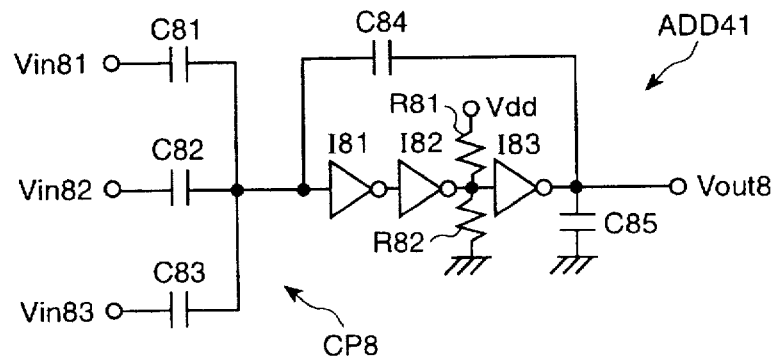
FIG. 8 shows the first adder in FIG. 4.

As shown in FIG. 8, the addition portion ADD41 includes a capacitive coupling CP8 constructed by capacitances C81, C82 and C83 of the number equal to the number of sampling and holding circuits in one group. An output of CP8 is connected to three serial stages of MOS inverters I81, I82 and I83. An output of MOS inverter I83 of the last stage is connected to an input of I81 through a feedback capacitance C84. An output of CP8 is generated at an output of I83 with a good linearity. Assuming input voltages of capacitances C81, C82 and C83 to be Vin81, Vin82 and Vin83, an output Vout8 of I83 can be expressed by the formula (4).

$$Vout8 = -\frac{C81Vin81 + C82Vin82 + C83Vin83}{C84} \quad (4)$$

Here, Vin81 to Vin83 and Vout8 are voltages referencing the reference voltage Vr. Also it is defined that the capacity ratio of capacitances of C81, C82, C83 and C84 is 1:1:1:3. A normalized output of inverted addition value can be obtained as in formula (5).

$$Vout8 = -\frac{Vin81 + Vin82 + Vin83}{3} \quad (5)$$

By the normalization, the maximum voltage is limited under the supply voltage.

An output of the last stage I83 is connected to the ground through a grounded capacitance C85. An output of the second stage inverter I82 is connected to the supply voltage Vdd and the ground through a pair of balancing resistances R81 and R82. Unstable oscillation of inverted amplifying circuit including feedback line is prevented by the structure.

Figure 9:
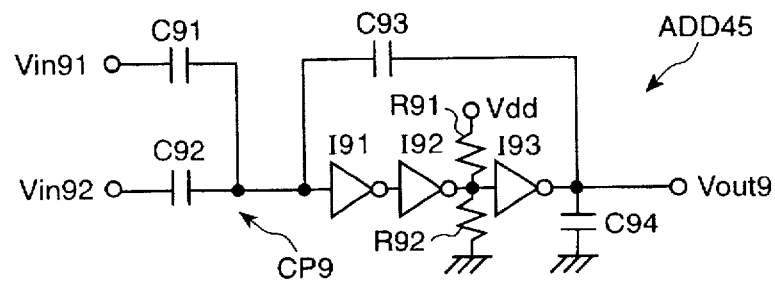
FIG. 9 shows a circuit of the fifth adder in FIG. 4.

As shown in FIG. 9, the addition portion ADD45 includes a capacitive coupling CP9 which includes capacitances C91 and C92 of corresponding number to the number of the addition portions ADD41 and ADD43. The output of CP9 is connected to three stages serial MOS inverters I91, I92 and I93. An output of MOS inverter I93 of the last stage is connected to an input of I91 through a feedback capacitance C93. An output of CP9 is generated at an output of I93 with a good linearity. Assuming input voltages of capacitances C91 and C92 to be Vin91 and Vin92, an output Vout9 of I93 can be expressed by the formula (6).

$$Vout9 = -\frac{C91Vin91 + C92Vin92}{C93} \quad (6)$$

Here, Vin91 and Vin92 are voltages referencing the reference voltage Vr. The capacitance ratio is C91:C92:C93= 1:1:2. Then, a normalized output of an inverted addition is obtained as in formula (7).

$$Vout9 = -\frac{Vin91 + Vin92}{2} \quad (7)$$

By the normalization, the maximum voltage is limited under the supply voltage.

An output of the last stage inverter I93 is connected to the ground through grounded capacitance C94. An output of the second stage inverter I92 is connected to the supply voltage Vdd and the ground through a pair of balancing resistances R91 and R92. The unstable oscillation of inverted amplifying circuit including feedback line is prevented.

Figure 10:
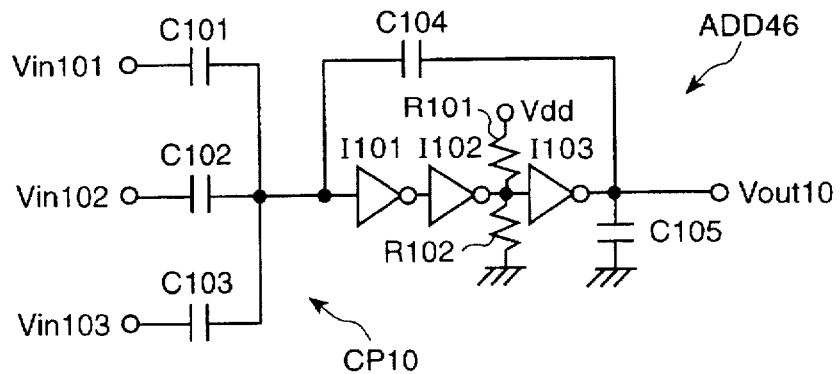
FIG. 10 shows a circuit of the sixth adder in FIG. 4.

As shown in FIG. 10, addition portion ADD46 includes capacitive coupling CP10 which includes capacitances C101, C102 and C103 of the number corresponding to the number of addition portion ADD42, ADD44 and ADD45 connected thereto, and an output of CP10 is connected to three stages serial MOS inverters I101, I102 and I103. An output of MOS inverter I103 of the last stage is connected to an input of I101 through a feedback capacitance C104. An output of CP10 is generated at an output of I103 with a good linearity. Assuming input voltages of capacitances C101, C102 and C103 (the voltage referencing Vr) to be Vin101, Vin102 and Vin103, an output Vout10 of I103 (the voltage referencing Vr) can be expressed by the formula (8).

$$Vout10 = -\frac{C101Vin101 + C102Vin102 + C103Vin103}{C104} \quad (8)$$

It is defined that the capacity ratio is C101:C102:C103:C104=1:1:2:2. A normalized output of inverted addition value can be obtained as in formula (9).

$$V_{out10} = -\frac{Vin101 + Vin102 + 2Vin103}{2} \qquad (9)$$

Here, the weight of C103 is defined twice as large as C101 and C102 so as to cancel the influence of the normalization by ADD45 and to agree to unnormalized V101 and V102. By the normalization, the maximum voltage is limited under the supply voltage.

An output of the last stage inverter I103 is connected to the ground through a grounded capacitance C105. An output of the second stage inverter I102 is connected to the supply voltage Vdd and the ground through a pair of balancing resistances R101 and R102. The unstable oscillation of inverted amplifying circuit including feedback is prevented.

Figure 11:
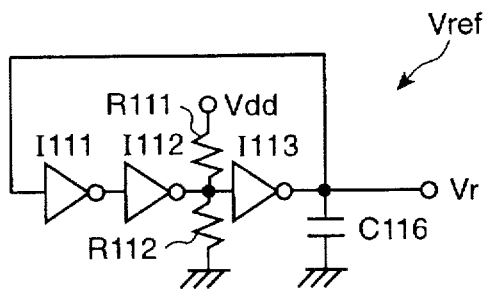
FIG. 11 shows a circuit for generating the reference voltage.

The reference voltage Vr is generated by a reference voltage generating circuit Vref in FIG. 11. The reference voltage generating circuit includes three stages serial inverters I111, I112 and I113, and an output of the last stage is fed back to the first stage input. Similarly to the inverted amplifying portions, unstable oscillation is prevented by a grounded capacitance C116 and balancing resistances R111 and R112. The output of the reference voltage circuit Vref converges to a stable point on which an input and output voltages are equal to each other, and any reference voltage can be generated by changing the threshold of each MOS inverter. Generally, in many cases, it is settled that Vr=Vdd/2 in order to keep dynamic range enough large in both directions of plus an minus. Here, Vdd is the supply voltage of MOS inverter.

Concerning to the matched filter circuit above, the size of the circuit is largely reduced comparing with digital one because an addition is performed by an analog system of a capacitive coupling, and processing speed is high because of parallel addition. As the inputs and outputs of the sampling and holding circuit and addition portion are all voltage signal, electric power consumption is low.

The accuracy of an output of an addition portion depends on the dispersion in characteristics of MOS inverters and in capacity ratio of capacitances. The dispersion of inverters can be minimized by placing them closely to one another. The accuracy of the capacity ratio of a capacitance can be improved by dispersively connecting a plurality of unit capacitances.

Figure 13:
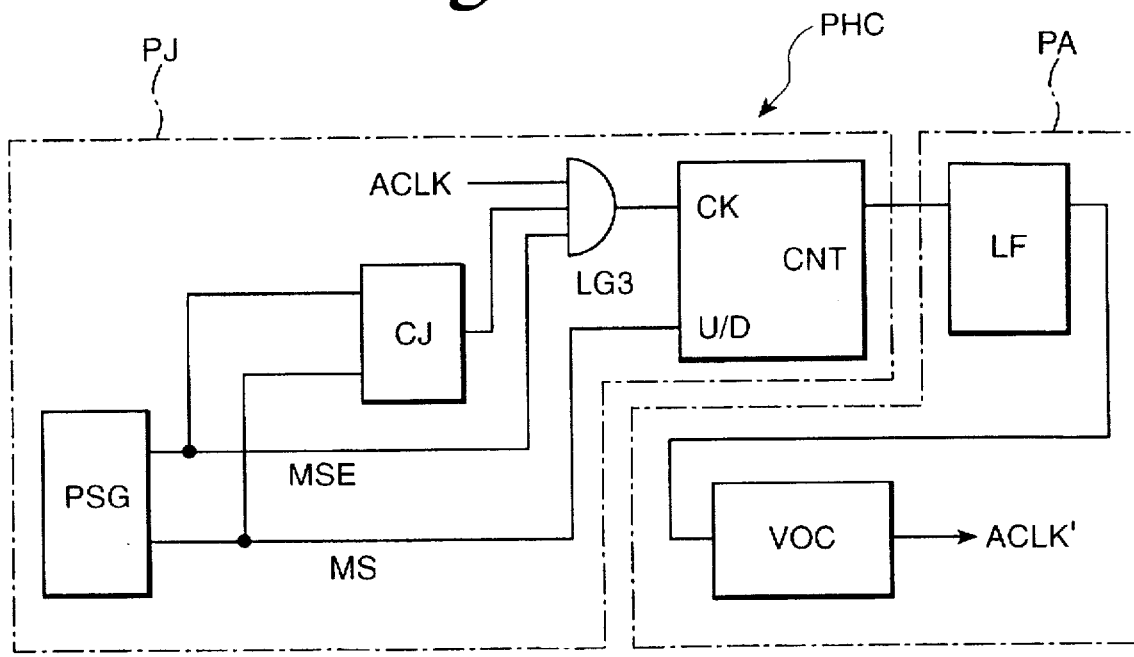
FIG. 13 shows a sampling clock generating circuit in the second embodiment.

The sampling clock generating circuit PHC in the embodiment above performs discrete phase adjustment, and the sampling clock generating circuit PHC in FIG. 13 is able to adjust successively.

In FIG. 13, the sampling clock generating circuit PHC consists of a phase signal generating circuit PSG and a convergence judgment circuit CJ similar to those in FIGS. 1 and 3. Outputs of MSE and MS of the circuit PSG are inputted to the circuit CJ. An output of the circuit CJ is inputted to a logical gate LG3, to which a sampling clock ACLK and a signal MSE are inputted. An output of the LG3 is inputted to a clock input of an up and down counter CNT. The signal MS is inputted to up/down designating input U/D of the up and down counter CNT. A gate LG3 is an AND gate. When it is impossible to judge the phase, that is, MSE=0, the gate LG3 is closed. When the phase adjustment is judged to be convergent in the circuit CJ, the gate LG3 is closed by the output signal. The clock ACLK is inputted to the counter CNT when the gate is open and counted. MS shows the gaining and lateness of the phase on the point of time. The counter CNT performs up-counting or down-counting corresponding to MS.

Figure 14:
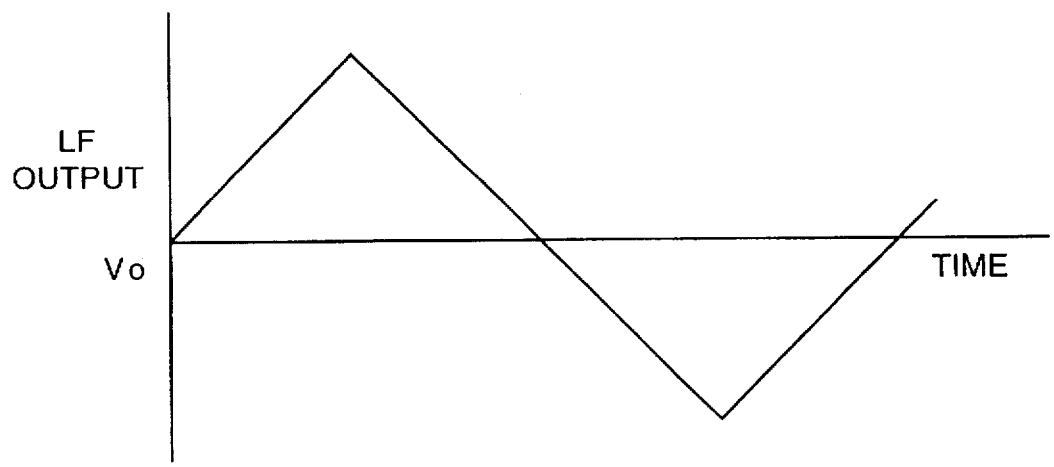
FIG. 14 shows a graph of outputs of a loop filter of the sampling clock generating circuit in FIG. 13.

The value counted by the counter CNT is inputted to a loop filter LF as a digital output and the integration of the counted value by time is calculated by a voltage by the loop filter. As shown in FIG. 14, outputs of the loop filter LF increase or decrease according to the gaining or lateness of a phase. The loop filter LF outputs a corresponding voltage after smoothing an output of the counter CNT. The reference voltage of the output is Vo. An output of the loop filter LF is inputted to a voltage controlling oscillator VCO and the phase adjustment of the clock ACLK is performed. In VCO, the phase is delayed according to the difference when the voltage corresponding to the counted value is higher than the reference voltage Vo, and it is fastened according to the difference when the voltage is lower. Consequently, adjusted clock ACLK' is outputted. The phase of ACLK is adjusted according to the formula (10) below. (Reference: "SPREAD SPECTRUM COMMUNICATION SYSTEM", Mitsuo YOKOYAMA, Kagaku-Gijutsu Shuppansha, 1988)

$$\frac{d\phi(t)}{dt} = 2\pi fc + Ke(t) \qquad (10)$$

$\phi(t)$: a phase of a sampling clock [radian]

t: time [second]

fc: frequency of a sampling clock [Hz]

K: constant gain of VCO [radian/(second·volt)]

e(t): input voltage [volt]

A matched filter according to the present invention samples input signal in response to three clocks from the first to the third shifted by a half cycle of a sampling signal so as to judge whether the sampling clock is ahead or behind of the input signal according to signs of input signal sampled. One clock is selected to be the sampling clock and performs phase adjustment according to it. Therefore, it is possible to synchronize an input signal and a sampling clock.

What is claimed is:

1. A matched filter circuit comprising:
   i) a sampling portion for sampling an input signal in response to a sampling clock;
   ii) a multiplication portion for multiplying said input signal by a PN code sequence;
   iii) an accumulation portion for accumulating outputs from said multiplying portion; and
   iv) a sampling clock generating portion for generating said sampling clock which comprises;
      (a) a phase judging circuit which samples said input signal in response to successive three clocks from the first to the third shifted by a half cycle of said sampling clock one after another so as to judge whether said sampling clock is ahead or behind of said input signal according to signs of said input signal sampled; and
      (b) a phase adjusting circuit for adjusting a phase of said sampling clock according to an output of said phase judging circuit.

2. A matched filter circuit as claimed in claim 1, said a phase adjusting circuit comprising:
   i) an adjusting clock generating circuit for generating a plurality of clocks within one cycle of said input signal, with frequency equal to said sampling clock;
   ii) a clock multiplexer for selectively outputting one of said plurality of clocks generated by said adjusting clock generating circuit as said sampling clock;
   iii) a clock selecting circuit for controlling and switching said clock multipliexer according to an output of said phase judgment circuit.

3. A matched filter circuit as claimed in claim 1, said phase adjusting circuit comprising:

i) an up-and-down counter for counting down or counting up said sampling clock according to whether said sampling clock is ahead or behind;

ii) a loop filter for integrating by time said counted value of said up-and-down counter; and iii) a voltage control oscillator receiving an output of said loop filter.

4. A matched filter circuit as claimed in claims 2, wherein said phase adjusting circuit judges that said phase is stable when said clock is alternately ahead and behind of said sampling clock and stops phase adjustment for a predetermined times period.

5. A matched filter circuit as claimed in claim 1, wherein a judgment is performed by said phase judging circuit only when signs of said input signal sampled by said first and third clocks are different.

6. A matched filter circuit as claimed in claim 1, wherein said phase judging circuit judges that said sampling clock is ahead when said signs of said input signal sampled by said first and second clocks are equal to each other, and judges that it is behind when said signs thereof are different.

7. A matched filter circuit as claimed in claim 1, comprising:

(I) a plurality of sampling and holding circuits each of which comprises;

i) a switch connected to an input voltage, ii) the first capacitance connected to an output of said switch, iii) the first inverted amplifying portion having odd number of stages of MOS inverters connected to an output of said first capacitance, iv) the first feedback capacitance for connecting an output of said first inverted amplifying portion to its input, and v) the first and the second multiplexers for alternatively outputting an output of said first inverted amplifying portion or a reference voltage;

(II) the first addition portion which comprises;

i) a plurality of the second capacitances corresponding to said sampling and holding circuits, to each of which an output of one of said sampling and holding circuits is connected, ii) the second inverted amplifying portion having odd number of stages of MOS inverters to which outputs of said second capacitances are commonly connected, iii) the second feedback capacitance for connecting an output of said second inverted amplifying portion to its input;

(III) the second addition portion which comprises;

i) a plurality of the third capacitances corresponding to said sampling and holding circuits, to each of which an output of said second multiplexer and an output of said first addition portion of each sampling and holding circuit is connected, ii) a third inverted amplifying portion having odd number of stages of MOS inverters to which outputs of said third capacitance are commonly connected, and iii) the third feedback capacitance for connecting an output of said third inverted amplifying portion to its input;

(IV) a subtraction portion for subtracting an output of said second addition portion from an output of said first addition portion, (V) a control circuit which closes said switch in one of said sampling and holding circuits, simultaneously opens other switches and switches said first and second multiplexers of each sampling and holding circuit by a predetermined combination.

8. A matched filter circuit as claimed in claim 7, wherein said sampling and holding circuits are classified into groups each of which comprises:

(I) the fourth addition portion to which an output of said first multiplexer is connected, outputs of said fourth addition portion of all of said groups being inputted to said second addition portion, said fourth addition portion comprising:

(a) a plurality of fourth capacitances to each of which an output of said first multiplexer of each said sampling and holding circuit is connected;

(b) the fourth inverted amplifying portion with odd number of serial MOS inverters, to which outputs of said fourth capacitances are commonly connected; and (c) the fourth feedback capacitance for connecting an output of said fourth inverted amplifying portion to its input, and (II) the fifth addition portion to which said second multiplexer is connected, outputs of said fifth addition portion of all of said groups being inputted to said first addition portion, said fifth addition portion comprising:

(a) a plurality of fifth capacitances to each of which said output of said second multiplexer of each said sampling and holding circuit and said output of said first addition portion are inputted;

(b) the fifth inverted amplifying portion with odd number of serial MOS inverters, to which outputs of said fifth capacitances are commonly connected; and (c) the fifth feedback capacitance for connecting an output said fifth inverted amplifying portion to its input.

9. A matched filter circuit as claimed in claim 7, wherein said reference voltage is generated by a reference voltage generating circuit which comprises a sixth inverted amplifying portion with odd number of stages of MOS inverter, an output thereof being connected to its input.

10. A matched filter circuit as claimed in claim 7, said inverted amplifying portion further comprising a grounded capacitance connected between said output and the ground and a pair of balancing resistances connecting an output of other MOS inverter than the last MOS inverter to a source and the ground.

11. A matched filter circuit as claimed in claim 9, wherein said reference voltage is settled to be ½ of a supply voltage of said MOS inverter.

12. A matched filter circuit as claimed in claim 7, wherein said control circuit controls said all sampling and holding circuits so that status of said sampling and holding circuits circularly changed.

13. A matched filter circuit as claimed in claim 7, wherein said first multiplexer alternatively outputs said output of said first inverted amplifying portion or said reference voltage, and said second multiplexer alternatively outputs said output of said first inverted amplifying portion or said reference voltage by inverse selection of said first multiplexer.

14. A matched filter circuit as claimed in claim 7, wherein one of said first and second multiplexer outputs said output of said first inverted amplifying portion, or both of them output said reference voltage.

\* \* \* \* \*